Oct. 6, 1931.  C. S. BRAGG ET AL  1,826,450
POWER ACTUATOR
Original Filed June 20, 1928   2 Sheets-Sheet 1
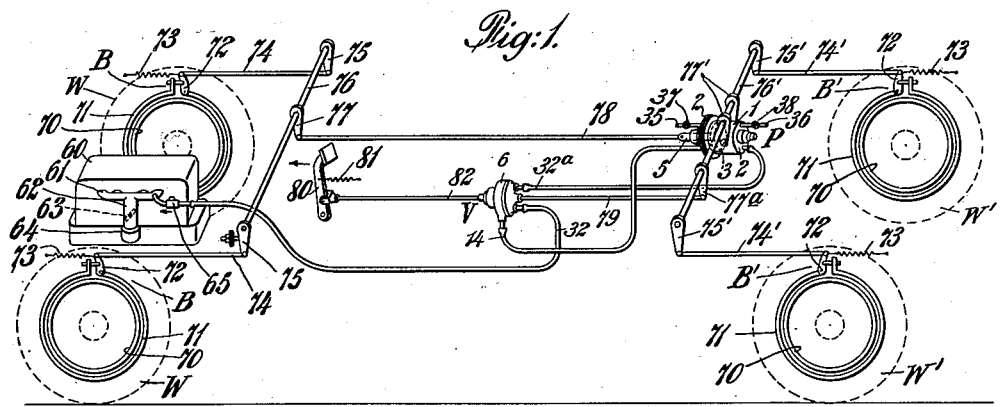
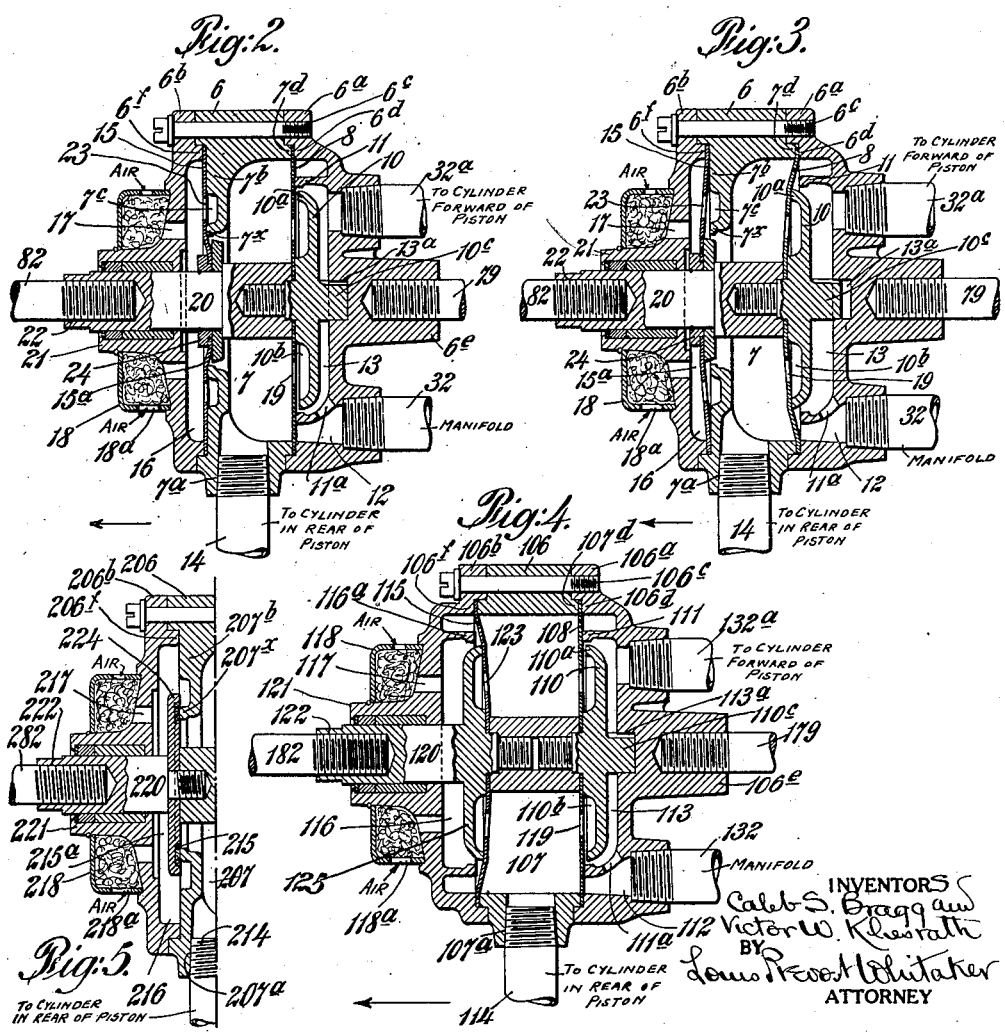

Oct. 6, 1931.     C. S. BRAGG ET AL     1,826,450
POWER ACTUATOR
Original Filed June 20, 1928     2 Sheets-Sheet 2

Patented Oct. 6, 1931

1,826,450

UNITED STATES PATENT OFFICE

CALEB S. BRAGG AND VICTOR W. KLIESRATH, OF LONG ISLAND CITY, NEW YORK, ASSIGNORS TO BRAGG-KLIESRATH CORPORATION, OF LONG ISLAND CITY, NEW YORK, A CORPORATION OF NEW YORK

POWER ACTUATOR

Application filed June 20, 1928, Serial No. 286,803. Renewed March 6, 1931.

Our invention consists in the novel features hereinafter described, reference being had to the accompanying drawings which illustrate several embodiments of the same, selected by us for purposes of illustration, and the said invention is fully disclosed in the following description and claims.

Our present invention relates to vacuum brake systems for automotive vehicles, and consists in the provision of an improved controlling valve mechanism for a suction actuated power actuator interposed between the power actuator and the suction and higher fluid pressure sources, and comprising among its members a valve actuating part operatively connected with two diaphragm valves, the construction of said valve mechanism being such that each of the diaphragm valves is always maintained in seated position by the differential of fluid pressures on its opposite faces whenever such differential of fluid pressures exists, which is obviously the only time when a valve is required to be firmly seated, thereby insuring against leakage, and producing a more reliable valve, and effecting a saving in manufacturing costs, by the elimination of springs. In other words, when either diaphragm is seated and a differential of fluid pressures exists upon its opposite faces, said differential of fluid pressures acts upon the valve to hold it more firmly seated and prevent leakage.

In the preferred form of our invention, when the parts are in the normal or released position, relatively smaller areas of the opposite faces of one diaphragm valve are subjected to the maximum differential of fluid pressures in a direction acting to resist the movement of the diaphragm valve by the operator and to hold said diaphragm in seated position, while relatively larger areas of the opposite faces of the other diaphragm are subjected to equal fluid pressures, the differential of fluid pressures on the smaller faces of said first mentioned diaphragm providing the initial resistance to the operation of the valve mechanism by the operator. When, however, the valve mechanism is operated to effect a power stroke of the actuator to apply the brakes, fluid pressure on the relatively smaller opposite faces of the first mentioned diaphragm are equalized as the relatively larger areas of the opposite faces of the other diaphragm are exposed to the gradually increasing differential of fluid pressures acting in opposition to the movement of the operator to maintain the second mentioned diaphragm unseated and corresponding substantially with the increase in the differential of fluid pressures on the movable pressure operated part of the power actuator, thus building up a resistance which will be felt by the operator, and will apprise him very accurately of the extent to which the power of the actuator is being exerted upon the brake mechanism connected therewith.

In the preferred form of our invention, the valve mechanism is located entirely exterior to the actuator in linkage between the operator operated part and the brake mechanism of the vehicle, preferably the brake mechanism to which the power actuator is operatively connected, provision being made to limit the relative movement between the valve actuating part and the casing of the valve mechanism, to enable the operator to apply his physical force to the brake mechanism in addition to the power exerted thereon by the actuator or for the purpose of applying the connected brake mechanism by physical force alone in case of failure of power.

Our invention also includes certain novel features of construction and combination of parts hereinafter fully described and particularly pointed out in the claims.

Referring to the accompanying drawings, which illustrate two embodiments of our invention, selected by us for purposes of illustration.

Fig. 1 is a diagrammatic representation showing a vacuum brake system for an automotive vehicle, embodying our present invention.

Fig. 2 is an enlarged sectional view of the controlling valve mechanism illustrated in Fig. 1, the parts being shown in the released or off position.

Fig. 3 is a similar view showing the parts in the positions which they occupy when moved to effect the power stroke of the actuator.

Fig. 4 is a view similar to Fig. 2, showing a slight modification of our invention.

Fig. 5 is a partial sectional view, similar to Fig. 2, showing another slight modification of our invention.

Figure 6:
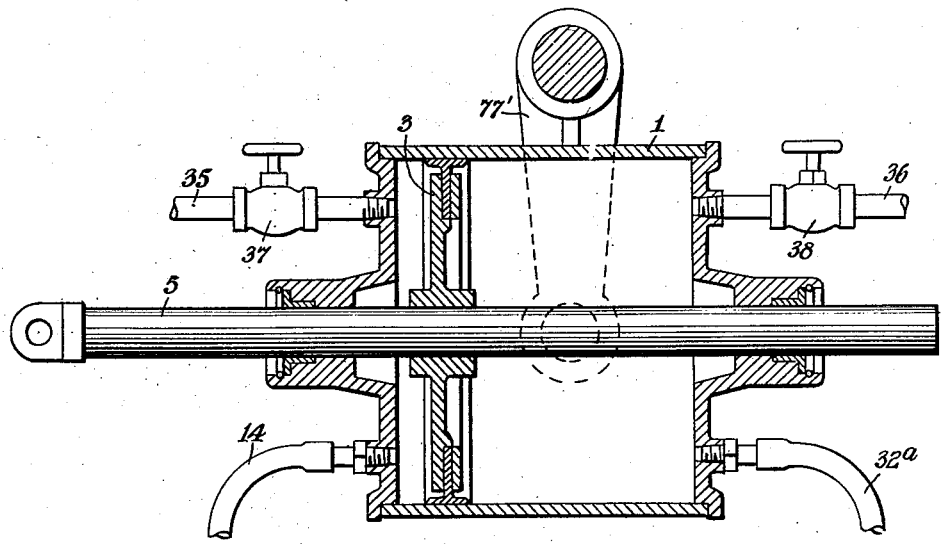
Fig. 6 is an enlarged sectional view of the actuator showing the pipe connections thereto.

Referring to Fig. 1, W, W, represent the front or steering wheels of an automotive vehicle, provided with brake mechanisms, indicated as a whole at B, B, and W', W', are the non-steering or traction wheels, which are shown in this instance provided with brake mechanisms, indicated as a whole at B', B', which brake mechanisms may be of any usual or desired construction. In the present instance each of said brake mechanisms is shown as comprising a brake drum, 70, a brake band, 71, a brake operating lever, 72, provided with a retracting spring, 73, the levers, 72 of the front wheel brake mechanisms being operatively connected by links, 74, with arms, 75, on a rock shaft, 76, and the levers, 72, of the rear wheel brake mechanisms being connected by links, 74', with arms, 75', on a rock shaft, 76'. P represents the power actuator, comprising in this instance a cylinder, 1, closed at both ends, by heads, 2, 2, and provided with a piston, 3, but movable with respect to the vehicle, the cylinder being connected with, and conveniently supported by, arms, 77' on the rock shaft, 76', and the piston, 3, being connected by a link, 78, with an arm, 77, on the rock shaft, 76, so that the relative movement of the piston and cylinder will apply and release both sets of brake mechanisms simultaneously. The controlling valve mechanism for the power actuator is indicated at V, as a whole, and the preferred form of our valve mechanism is constructed, for example, as illustrated in Figs. 2 and 3.

For convenience of manufacture and assembly, the casing of the valve mechanism is preferably formed in three parts, to wit, a central member, 6, and a pair of end plates, 6ª, and 6ᵇ, respectively, constructed and arranged as hereinafter described, and united in any suitable manner, as for example, by screws or bolts, 6ᶜ. The central casing member, 6, is provided with an interior central chamber, 7, having an outlet aperture, 7ˣ, which in this instance is connected by a flexible tubing, 14, with the cylinder, 1, of the actuator, in rear of the piston therein. In the form of the invention shown in Figs. 2 and 3, the central casing member is also provided at one side of the chamber, 7, with an inwardly extending annular flange, 7b, having an annular groove, 7c, on its outer face, and forming an annular seat, 7x, adjacent to the inner edge of said flange. The central casing member is also provided at the opposite end thereof with an annular clamping face, indicated at 7d. The end plate 6a, of the casing, shown as the rear end plate in Figs. 1, 2 and 3, is constructed to fit accurately on the adjacent face of the central casing member, 6, and is provided with a clamping face, 6d, between which and the clamping face, 7d, the marginal portions of a flexible diaphragm valve, indicated at 8, are securely clamped so as to make an air tight joint therewith, and between the sections of the valve casing. The end plate, 6a, is provided interiorly with an annular diaphragm engaging seat, indicated at 11, which, when the diaphragm is seated thereon, divides the space within said end plate into a central chamber, 13, and an annular chamber, 12, one of which is connected to the source of suction, and the other of which is connected to the actuator cylinder forward of the piston. In this instance the annular chamber, 12, which we term the suction chamber of the valve casing, is connected by a pipe, 32, with the suction passage of the internal combustion engine for propelling the vehicle, or vehicles (as in the case of a tractor or trailer). In Fig. 1, the engine is indicated at 60, and is shown provided with a suction passage, including a vertical portion, 62, and the usual intake manifold, 61, said suction passage leading from the carburetor, indicated at 64, to the engine cylinder, and the vertical portion, 62, thereof, being provided with the usual throttle valve, indicated at 63. The suction pipe, 32, before referred to, is connected to the suction passage between the throttle valve and the engine cylinders, and preferably is connected to the intake manifold, 61, as shown, and is provided with a check valve, 65, opening in the direction of the small arrow in Fig. 1, that is to say, toward the intake manifold. The central chamber, 13, of the end plate, 6a, is connected by means of a flexible pipe, 32a, with the actuator cylinder, 1, forward of the piston therein. The annular seat, 11, is provided with an aperture therein, indicated at 11a, which places the suction chamber, 12, at all times in communication with the central chamber, 13, so that the forward end of the cylinder is at all times maintained in direct communication with the intake manifold.

Within the central chamber, 13, is located a disc valve, 10 provided with an annular diaphragm engaging seat, 10a, and forming a chamber, indicated at 10b, between the diaphragm, 8, and the disc valve, which communicates at all times with the chamber, 7, in the central casing member, 6, by means of apertures, 19, in the diaphragm, 8. The disc, 10, and diaphragm, 8, have their central portions sealingly secured to a valve actuating part, indicated at 20, extending through a central aperture in the forward end plate, 6b, as hereinafter described, and we prefer to provide the disc valve, 10, with a guiding portion, 10c, engaging a guiding recess, 13a, in the end plate, 6a, although this is not essential. The end plate, 6a, is also provided with means for connecting it, as hereinafter described, in linkage between an operator operated part and a brake mechanism operated by the power actuator, being shown provided with a boss, 6e, having an internally threaded aperture to receive the threaded end of a link rod, 79.

The forward end plate, 6b, of the valve casing is provided with an annular clamping shoulder, 6f, for clamping the marginal portions of a diaphragm, 15, between the flange, 6f, and the flange, 7b, of the central casing member, and forming an air tight connection between the parts. This diaphragm, 15, is normally seated upon the annular seat, 7x, of the flange 7b, and the central portions of the diaphragm are sealingly secured to the valve actuating part, 20, in any usual or desired manner, so as to move the diaphragm, 15, toward or away from the seat, 7x. The diaphragm is provided with an annular portion, 15a, of comparatively small area between the seat, 7x, and the valve actuating part, which is not supported by the flange, 7b, in the normal position of the parts, indicated in Fig. 2, and the end plate, 6b, is provided with a chamber, indicated at 16, on the outer face of the diaphragm, 15, which is at all times in communication with the atmosphere through an aperture, or apertures, 17. We preferably provide an air strainer, 18, having inlet apertures, 18a, for preventing the admission of dust to the interior of the valve casing. The valve actuating part, 20, extends through a guiding sleeve, 21, located centrally of the end plate, 6b, and is provided with means for attaching it in the linkage between the operator operated part and a brake mechanism of the vehicle, being in this instance provided with an interiorly threaded aperture, 22, to receive the threaded end of a link rod, 82.

In the installation shown in Fig. 1, we have shown an operator operated part, consisting of a foot lever, 80, which is provided with the usual retracting spring, 81, and in this instance we have shown the rod, 82, connected with the foot lever, and the rod, 79, connected with an arm, 77a, on the rock shaft, 76', for operating the rear or non-steering wheel brake mechanisms. The spring, 81, need only be sufficient to counterbalance the weight of the foot lever.

Assuming that the parts of the valve mechanism are in the normal position indicated in Fig. 2, and that the engine is running, and the throttle valve closed, or partly closed, rarefication in the intake manifold will exhaust the air from the suction pipe, 32, and from the cylinder forward of the piston, through the pipe, 32a, chamber, 13, passage, 11a, and the suction chamber, 12, and, as in the normal position of the valve mechanism, the seat, 10a, of the disc valve, 10, is out of engagement with the diaphragm, 8, the central chamber, 7, will be placed in communication with the chamber, 12, through the apertures, 19, in the diaphragm, and the unseated disc valve, 10, and hence the air will also be exhausted from the actuator cylinder in rear of the piston through the pipe, 14. A partial vacuum is therefore maintained within the actuator cylinder on both sides of the piston, which is therefore, as we term it, maintained submerged in vacuum. The check valve, 65, in the suction pipe, 32, also insures that the degree of rarefication in the cylinder on both sides of the piston, also within the valve mechanism, shall be the maximum degree of rarefication which occurs in the manifold between operations of the actuator to apply the brake mechanism. It will also be seen that in the released position of the valve mechanism illustrated in Fig. 2 pressures are equalized on the opposite faces of the diaphragm, 8, as both sides are subjected to the degree of rarefication existing in the cylinder. The diaphragm, 15, is subjected on its outer face to atmospheric pressure, and the portion of said diaphragm within the seat, 7x, is subjected on its inner face to the rarefication in chamber, 7, so that the diaphragm, 15, is held seated upon the flange, 7b, and the seat, 7x, by the differential of fluid pressures upon a small area of the diaphragm within the seat, 7x. This differential of fluid pressure is applied to the valve actuating stem, 20, in a direction to hold the diaphragm, 15, seated on the seat, 7x, and to maintain the disc valve, 10, unseated with respect to the diaphragm, as indicated in Fig. 2. The diaphragm, 15, is provided with one or more air inlet apertures, indicated at 23, communicating with the annular recess, 7c, in the flange, 7b, so that fluid pressures are substantially equalized on the diaphragm, 15, with the exception of the portion between the seat, 7x, and the valve actuating part, 20. The differential of fluid pressures on this part of the diaphragm, 15, is however, sufficient to seat said diaphragm without the interposition of any spring; and the spring, 81, as before stated, need only be sufficient to counterbalance the weight of the pedal lever, 80.

To effect an application of the brakes, the operator will place his foot on the pedal lever, 80, and press it forward, in the direction of the arrows, Figs. 1, 2, and 3. This will seat the disc valve, 10, on the diaphragm, 8, separating the central chamber, 7, from communication with the chamber, 13, and with the suction passage by way of pipe, 32, and the end of the cylinder connected by way of the pipe, 32a, but leaving the forward portion of the cylinder of the actuator in communication with the manifold through pipes, 32a and 32. Thereafter the diaphragm, 15, will be unseated from the seat, 7x, thereby placing the central chamber, 7, of the valve casing in communication with the atmosphere, through the apertures, 23, in the diaphragm, 15, and thus admitting atmospheric air to said chamber, 7, and through the pipe, 14, to the end of the actuator cylinder connected therewith, where pressures will accumulate and effect a power stroke of the actuator to apply brake mechanisms for the steering and non-steering wheels simultaneously. It will also be seen by reference to Fig. 3, which shows the parts in the positions above described, that the disc valve, 10, and the portion of the diaphragm between the valve seat, 10a, and the casing members, 6, and 6a, are subjected on one face to the degree of rarefication existing in the chambers, 12, and 13, while they are subjected on their correspondingly opposite faces to pressures, existing and gradually accumulating in the central chamber, 7, which pressure corresponds substantially with that in the higher pressure portion of the actuator cylinder, so that the differential or fluid pressures on the opposite faces of the diaphragm, 8, and disc valve, 10, is substantially the same as the differential of fluid pressures on the opposite faces of the piston, and on the opposite ends of the cylinder of the actuator, and will be exerted in a direction to move the valve actuating part, 20, rearwardly, or against the direction in which it is moved by the pedal lever for an application of the brakes, so that a gradually increasing resistance will be felt by the operator corresponding proportionately with the amount of pressure exerted on the brake mechanism by the power actuator, which will apprise the operator as to the extent to which the brakes are being applied. It will be understood that during the power stroke of the actuator, the fluid pressures on opposite faces of the diaphragm, 15, will be correspondingly reduced. It will also be understood that the entire valve mechanism will move forward with the pedal lever during the power stroke of the actuator, and that as long as the forward movement of the pedal lever continues, and the operator overcomes the increasing resistance to its forward movement, atmospheric air will be delivered to the actuator cylinder on one side of the piston and the power stroke will continue without, however, admitting any appreciable quantity of air from the actuator cylinder forward of the piston to the intake manifold, thus obviating any danger of stalling the engine, if idling, during the application of the brake mechanism. As soon as the forward movement of the pedal lever ceases, a slight continued movement of the cylinder, which is connected to the valve casing through the rock shaft, 76', will move the valve casing in the direction of the arrow, Fig. 3, with respect to the valve actuating part, and permit the diaphragm, 15, to seat on the seat, 7x, preventing a further admission of atmospheric air, without, however, unseating the disc valve, 10, from the diaphragm 8, thus holding the brakes as applied. Further power may be applied to the brakes by the actuator, by a further movement of the pedal lever, 80, until the maximum power of the actuator has been exerted upon the brake mechanisms with which it is connected.

We also provide means for limiting the relative movement between the valve actuating part, 20, and the valve casing. In this instance the valve actuating part is provided with a collar, 24, adapted to engage the forward end plate, 6b, to limit the relative movement between said part, and it will be obvious that the operator, by taking up this lost motion, can apply his physical force directly to the brake mechanisms for the rear or non-steering wheels with which the rod, 79, is connected, in addition to the power exerted thereon by the actuator and without increasing the braking force of the steering wheel brake mechanisms, or for the purpose of operating the brake mechanisms for the non-steering wheels, by physical force alone in case of failure of power, in which case the relative movement of the valve actuating part and valve casing in taking up the lost motion would place the valves in position to vent the cylinder.

It will be understood that the valve mechanisms shown in Figs. 1, 2 and 3 can be employed to control one or any number of power actuators which may be located upon the same or upon different vehicles, and connected by suitable piping with the valve mechanism or with the actuator, P. For example, in Fig. 1, we have shown the actuator cylinder, 1, provided with pipes, 35 and 36, communicating with the cylinder on opposite faces of the piston, for connecting the valve mechanism, V, in this instance through the cylinder, 1, with the corresponding portions of the cylinder, or cylinders, of another actuator, or other actuators, in which case all of the actuators would be controlled simultaneously by the valve mechanism, V. The pipes, 35 and 36, are shown provided with cut off valves, 37, and 38, respectively, so that they may be closed when no other actuators are to be connected.

To release the brake mechanisms after they have been applied by the power actuator, the operator will release the pressure of his foot on the pedal lever, or remove his foot altogether when the differential of fluid pressures on opposite faces of the disc valve, 10, will force the valve actuating part rearwardly so as to unseat it from the diaphragm, 8, restoring the parts to the position shown in Fig. 2. The diaphragm, 15, has already seated itself on the seat, 7x, and shut off the central chamber, 7, from communication with the atmosphere, and as soon as the disc valve, 10, is unseated, the chamber, 7, will be placed in communication with the chamber, 13, with the suction passage of the engine through the pipe, 32, and with the other end of the cylinder through the pipe, 32a, and the air previously admitted to the actuator cylinder will be withdrawn. Fluid pressures on opposite faces of the piston and cylinder and upon opposite faces of the diaphragm, 8, and disc valve, 10, will be equalized by the withdrawal of air from the cylinder on one side of the piston either into the suction passage of the engine or into the cylinder on the other side of the piston, or both, and the brake mechanism will be retracted together with the piston of the actuator, by the retracting means for the brakes, as the spring, 73. When the pressures on opposite faces of the diaphragm, 8, and disc valve, 10, have been completely equalized, there will be a maximum differential of fluid pressures upon the inner marginal portions, 15a, of the diaphragm, 15, between the seat, 7x, and the valve actuating part, as previously stated, which will hold the valves in normal position and provide the initial resistance to be overcome by the operator. A spring, indicated at 81, may be provided to return the pedal, 80, and hold it in the "off" or released position where the weight of the pedal exceeds the differential of fluid pressures on the diaphragm, 15.

It will be noted that whenever a differential of fluid pressures exists on opposite faces of either diaphragm valve, this differential of pressures acts in a direction to seat the valve and hold it firmly seated to prevent leakage. It will also be noted that whenever pressures are fully equalized on the opposite faces of one diaphragm, the faces of the other diaphragm are subjected to the maximum differential of fluid pressures acting against the operator, and whenever a differential of fluid pressures exists simultaneously on opposite faces of both diaphragms, the result or total differential of fluid pressures acts against the operator. The area of the exposed faces of the diaphragm, 15, normally exposed to the maximum differential of pressures when the valve is in released position being much smaller than the area of the diaphragm 8, on the opposite faces of which fluid pressures are equal in the released position, it naturally follows that when pressures are equalized on the diaphragm, 15, and the opposite faces of diaphragm, 8, are subjected to an increasing differential of fluid pressures over a larger area, a resistance or reaction will be built up which will be felt by the operator and apprise him of the amount of power being applied to the brake mechanisms by the actuator.

Our improved valve mechanism herein shown and described may be constructed in such a manner that the reactionary feature may be omitted, if desired, by making the exposed areas of both diaphragms of substantially the same areas. Such a construction is illustrated as a modification in Fig. 4, in which the parts corresponding with those shown in Figs. 2 and 3 are given the same reference numbers with the addition of 100. As shown in this figure, the construction of the central member of the valve casing, 106, and the rear plate member, 106a, in the pipe connections therefrom, are, as hereinbefore described, and the construction of the diaphragm, 108, and disc valve, 110, is likewise identical with that previously described. The front end plate, 106b, is in this instance formed substantially like the end plate, 106a, except that it is provided with air inlets, 117, and the air strainer, 118, and the central guiding sleeve, 121, through which the valve actuating part, 120, extends. This end plate, 106b, is provided interiorly with an annular wall, or seat, 116a. The diaphragm, 115, is in this instance provided with an aperture, or apertures, 123, communicating with the central chamber, 107, and adapted to be shut off from the atmosphere in chamber, 116, by a second valve, 125, carried by the valve actuating part, and held in seated relation with the diaphragm, 115, when the parts are in the released position shown in Fig. 4.

As indicated in this figure, when the parts are in the released positions, both faces of the diaphragm, 108, and disc valve, 110, will be exposed to rarefication, and the pressures thereon will be equal. The inner face of the diaphragm, 115, will be exposed to rarefication in chamber, 107, as will the inner face of the disc valve, 125, the outer faces of said disc valve and diaphragm being exposed to atmospheric pressure which holds the parts in the released position and provides the initial resistance which must be overcome by the foot of the operator.

In the operation of this form of valve mechanism, when the valve actuating part, 120, is moved in the direction of the arrow in Fig. 4, to apply the brakes, the disc valve, 110, will be seated, cutting off the central chamber, 107, and the cylinder in rear of the piston from the suction passage of the engine, and thereafter the disc valve, 125, will be unseated from the diaphragm, 115, to admit atmospheric air to the chamber, 107, and to the portion of the cylinder in rear of the piston. This movement will be resisted by the initial resistance provided by the differential of fluid pressures on the diaphragm, 115, and disc valve, 125. When the valves have been moved to the position to effect a power stroke, and atmospheric air begins to fill up the central chamber 107, and the cylinder in rear of the piston, and build up a pressure therein, the increasing pressure in chamber, 107, will tend to equalize the pressures on the opposite faces of the diaphragm, 115, and disc valve, 125, and simultaneously build up a correspondingly increasing differential of fluid pressures on the opposite faces of the diaphragm, 108, and disc valve, 110, so that there will be no increase in the pressure exerted on the foot of the operator in opposition to the movement of the pedal lever, or in other words, the initial resistance will remain unchanged. Otherwise the device operates in exactly the same manner as previously described and the differential of fluid pressures on either diaphragm will always be in a direction to restore the parts to released position.

In Fig. 5 we have shown another slight modification of the valve mechanism shown in Figs. 2 and 3, in which we employ a disc valve for directly engaging the annular valve seat in lieu of the diaphragm type of valve illustrated in those figures, at 15. In Fig. 5 the parts corresponding with those shown in Figs. 1, 2 and 3 are given the same reference characters, with the addition of 200. The construction of the valve casing is identical with that previously described with reference to Figs. 2 and need not be further referred to. The valve actuating part, 220, is provided with a rigid disc, indicated at 224, the inner face of which is provided with a sealing valve member, indicated at 215, of compressed cork, cork composition, or other suitable material, to engage the valve seat, indicated at 207$^x$, for closing off the communication between the central chamber, 207, and the exterior chamber, 216, which is in communication with the atmosphere through apertures 217.

The operation of this valve mechanism will be exactly the same as that previously described with reference to Figs. 2 and 3, and need not be repeated.

In Figs. 1 to 5 we have illustrated the valve mechanism arranged to be inserted in linkage between the operator operated part and certain brake mechanism of the vehicle, preferably the brake mechanism for the rear or non-steering wheels, to which the physical force of the operator may be applied when desired, as previously explained. We wish it to be understood, however, that this form of valve mechanism may also be employed in linkage between the operator operated part and a fixed part connected with the vehicle, yielding resistance means, as a spring, being inserted between the valve casing and the part to which it is connected, as in our former application for Letters Patent of the United States filed June 6th, 1928, and given Serial No. 283,182, and in such arrangement, provision may also be made, if desired, for enabling the operator to add his physical force to certain brake mechanisms if desired, by taking up the lost motion suitably provided therefor, between the operator operated part and the brake mechanism, as set forth in our former application.

Figure 7:
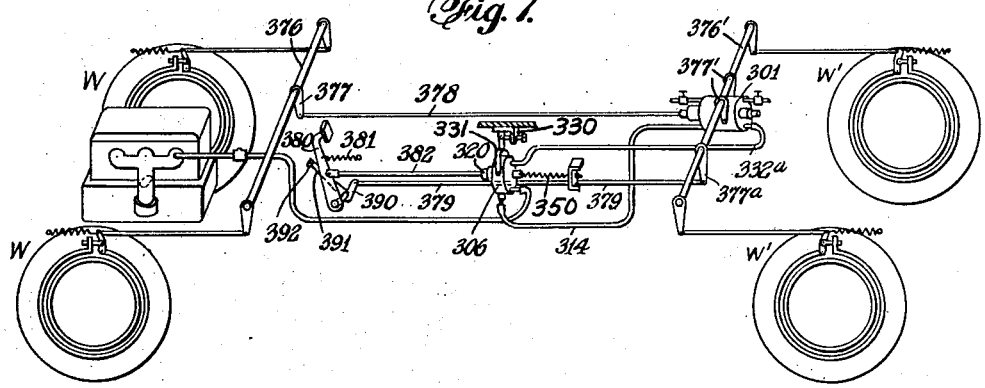
Fig. 7 is a view similar to Fig. 1 showing a slight modification.

We have illustrated such a construction in Fig. 7, in which the parts corresponding to those shown in Fig. 1 are given the same reference numerals with the addition of 300 to avoid repetition. In this construction the valve casing, 306, is suspended from the chassis by a yoke, 330, provided with a stop, 331. The valve casing is connected by a spring, 350, with a part connected with the chassis, in this instance a fixed part, and the valve actuating part, 320, is connected by link, 382, with pedal lever, 380. A power applying lever, 390, is connected by link rod, 379, with brake mechanism, in this instance being connected to an arm, 377$^a$, on the rock shaft, 376$^1$, and the lever, 390, is provided with an arm, 391, extending forward of the pedal lever and having a projection, 392, in the path of said pedal lever.

The forward movement of the pedal will in this instance move the valve casing forward and increase the tension of spring, 350, until it presents sufficient resistance to enable the pedal to move the valve actuating part with respect to the valve casing and operate the valves to effect the application of the brakes. If the operator stops the forward movement of the pedal, the differential of fluid pressures on the opposite faces of the diaphragm and disc valve and on the opposite faces of the rear wall of the valve casing will, as soon as it is sufficient to overcome the spring, 350, move the valve casing forward and seat the diaphragm, thus providing the follow-up operation of the valve. When the tension of spring, 350, is increased beyond a point where it can be overcome by the maximum differential of fluid pressures on the valve mechanism, the brakes will have been applied with the full force of the actuator, and the operator by further depressing the pedal lever can bring it into contact with the projection, 392, and apply his physical force in addition to that of the operator. The operator can also apply the brakes by physical force alone, through projection, 392, and the parts connected thereto.

Where we have referred to the portions of the cylinder forward of the piston and in rear of the piston, these terms are to be understood with reference to the stroke of the piston and not with reference to the position of the cylinder with respect to the vehicle, that is to say, the portion of the cylinder forward of the piston is located on the side thereof toward which the power stroke is made, and rear of the piston refers to the portion of the cylinder on the opposite face of the piston regardless of the manner in which the piston is arranged with respect to the vehicle.

What we claim and desire to secure by Letters Patent is:—

1. In valve mechanism for controlling power actuators, the combination with a valve casing provided with adjacent chambers provided with an aperture for placing them in communication, valve means for controlling said communicating aperture having oppositely disposed faces subjected at all times to the pressures in said respective chambers, means for connecting one of said chambers at all times with a source of lower fluid pressure, means for connecting said lower pressure chamber at all times with a portion of an actuator on one side of a movable member thereof, means for connecting the other of said chambers with the actuator on the other side of said movable member, said last mentioned chamber having an aperture for admitting higher pressure fluid to said second chamber, a second valve means for closing said aperture having its outer face exposed at all times to the higher fluid pressure and normally holding said second valve means in closed position, valve actuating means connecting said second means with said first mentioned valve means and holding the latter in position to connect said chambers when said former valve member is held in closed position by the higher pressure fluid to connect the actuator on both sides of its said movable member with the source of lower pressure, whereby whenever either of said valve means is in closed position, a differential of pressures will exist on opposite faces thereof tending to hold it firmly closed, and an operator operated part connected with said valve actuating part.

2. In valve mechanism for controlling power actuators, the combination with a valve casing, a diaphragm valve having portions in sealing engagement therewith and forming a chamber on the outer side of said diaphragm, means for connecting said chamber at all times with a source of lower fluid pressure and with portions of an actuator on one side of a movable member thereof, a disc valve in said chamber having a diaphragm engaging seat, said casing being provided with a second chamber on the opposite side of said diaphragm, means for connecting said second chamber with portions of the actuator on the opposite side of said movable member thereof, said second chamber being provided with an aperture for the admission of higher fluid pressure thereto, valve means for closing said aperture having its outer face exposed at all times to the higher fluid pressure, and its inner face to the fluid pressure in said second chamber, said diaphragm being provided with an aperture for connecting said chambers located in position to be closed when said disc valve is seated thereon, a valve actuating part connecting said valve means with said diaphragm and disc valve, and sealingly engaging the same and holding said disc valve unseated when said valve means is held in closed position by said higher fluid pressure on its outer face, to connect the actuator on both sides of its movable portion with the source of lower fluid pressure, whereby whenever either said valve means or the diaphragm and disc valve are in closed position, a differential of fluid pressures will exist on the opposite faces thereof tending to hold it firmly closed, and an operator operated part connected with said valve actuating part.

3. In valve mechanism for controlling power actuators, the combination with a valve casing provided with adjacent chambers provided with an aperture for placing them in communication, valve means for controlling said communicating aperture having oppositely disposed faces subjected at all times to the pressures in said respective chambers, means for connecting one of said chambers at all times with a source of lower fluid pressure, means for connecting said lower pressure chamber at all times with a portion of an actuator on one side of a movable member thereof, means for connecting the other of said chambers with the actuator on the other side of said movable member, said last mentioned chamber having an aperture for admitting higher pressure fluid to said second chamber, a second valve means for closing said aperture having its outer face exposed at all times to the higher fluid pressure and normally holding said second valve means in closed position, valve actuating means connecting said second valve means with said first mentioned valve means and holding the latter in position to connect said chambers when said former valve member is held in closed position by the higher pressure fluid, to connect the actuator on both sides of its said movable member with the source of lower pressure, and an operator operated part connected with said valve actuating part, the portion of said second valve means subjected on its opposite faces to differential fluid pressures when in closed position being of less area than the portions of said first mentioned valve means exposed on opposite faces to differential fluid pressures when in closed position, and the differentials of pressures on both valve means acting to resist the movement of said operator operated part in a direction to move said second valve means to open position, and said first valve means to closed position, whereby said movement will effect the building up of an increased differential of fluid pressures on the larger areas of said first valve means which will be transmitted to the operator operated part.

4. In valve mechanism for controlling power actuators, the combination with a valve casing, a diaphragm valve having portions in sealing engagement therewith and forming a chamber on the outer side of said diaphragm, means for connecting said chamber at all times with a source of lower fluid pressure and with portions of an actuator on one side of a movable member thereof, a disc valve in said chamber having a diaphragm engaging seat, said casing being provided with a second chamber on the opposite side of said diaphragm, means for connecting said second chamber with portions of the actuator on the opposite side of said movable member thereof, said second chamber being provided with an aperture for the admission of higher fluid pressure thereto, valve means for closing said aperture having its outer face exposed at all times to the higher fluid pressure, and its inner face to the fluid pressure in said second chamber, said diaphragm being provided with an aperture for connecting said chambers located in position to be closed when said disc valve is seated thereon, a valve actuating part connecting said valve means with said diaphragm and disc valve, and sealingly engaging the same and holding said disc valve unseated when said valve means is held in closed position by said higher fluid pressure on its outer face, to connect the actuator on both sides of its movable portion with the source of lower fluid pressure, and an operator operated part connected with said valve actuating part, the portion of said valve means subjected to differential fluid pressures when in closed position being of less area than the portions of said diaphragm and disc valve exposed on opposite faces to differential fluid pressures when in seated relation, and the differentials of pressures on both valve means acting to resist the movement of said operator operated part in a direction to move said valve means to open position and to seat said disc valve, whereby said movement will effect the building up of an increased differential of fluid pressures on the larger areas of said diaphragm and disc valve, which will be transmitted to the operator operated part.

5. In valve mechanism for controlling power actuators, the combination with a valve casing, a diaphragm valve having portions in sealing engagement therewith and forming a chamber on the outer side of said diaphragm, means for connecting said chamber at all times with a source of lower fluid pressure and with portions of an actuator on one side of a movable member thereof, a disc valve in said chamber having a diaphragm engaging seat, said casing being provided with a second chamber on the opposite side of said diaphragm, means for connecting said second chamber with portions of the actuator on the opposite side of said movable member thereof, said second chamber being provided with a seat, a second diaphragm for engaging said seat, exposed on its inner face to the pressure in said second chamber, and to the pressure in said second chamber on its outer face to the higher pressure fluid at all times in a direction to seat said diaphragm valve, means for admitting higher pressure fluid to said second chamber when said second diaphragm valve is unseated, a valve actuating part connected sealingly with said diaphragms, and said disc valve, the pressure of the higher pressure fluid on said second diaphragm valve normally holding it seated and the disc valve unseated, and an operator operated part connected with said valve actuating part.

6. In valve mechanism for controlling power actuators, the combination with a valve casing, a diaphragm valve having portions in sealing engagement therewith and forming a chamber on the outer side of said diaphragm, means for connecting said chamber at all times with a source of lower fluid pressure and with portions of an actuator on one side of a movable member thereof, a disc valve in said chamber having a diaphragm engaging seat, said casing being provided with a second chamber on the opposite side of said diaphragm, means for connecting said second chamber with portions of the actuator on the opposite side of said movable member thereof, said second chamber being provided with a seat, a second diaphragm for engaging said seat, exposed on its inner face to the pressure in said second chamber, and on its outer face to the higher pressure fluid at all times in a direction to seat said diaphragm valve, means for admitting higher pressure fluid to said second chamber when said second diaphragm valve is unseated, a valve actuating part connected sealingly with said diaphragms and said disc valve, the pressure of the higher pressure fluid on said second diaphragm valve normally holding it seated and the disc valve unseated, and an operator operated part connected with said valve actuating part, the portion of said second diaphragm exposed on opposite faces to differential fluid pressures when in seated position being of smaller area than the opposite faces of said first diaphragm and disc valve, exposed to differential fluid pressures when seated, and the differential of pressures on both of said valve means resisting the movement of the operator operated part, whereby the movement of said operator operated part to unseat said second diaphragm valve and seat the disc valve will effect the building up of an increased fluid pressure on the first diaphragm valve and the disc valve, which will be transmitted to the operator operated part.

7. In valve mechanism for controlling power actuators, the combination with a valve casing, a diaphragm valve having portions in sealing engagement therewith, and forming a chamber on the outer side of said diaphragm, means for connecting said chamber at all times with a source of lower fluid pressure and with portions of an actuator on one side of a movable member thereof, a disc valve in said chamber having a diaphragm engaging seat, a second diaphragm valve in said casing having portions in sealing engagement therewith and forming a central chamber between said diaphragms, a seat for engaging said second diaphragm, means for connecting said central chamber with portions of the actuator on the opposite side of said movable member thereof, said first mentioned diaphragm being provided with an aperture for connnecting said chambers located in position to be closed when said disc valve is seated, said second diaphragm having an aperture therethrough for admitting higher pressure fluid to said central chamber located in position to be closed when said second diaphragm is seated, and a valve actuating part connected with said diaphragms and disc valve and sealingly engaging the same, said second diaphragm being normally held in seated position by the higher pressure fluid and holding said disc valve unseated to connect the actuator on both sides of said movable member thereof with the source of lower pressure.

8. In valve mechanism for controlling power actuators, the combination with a valve casing, a diaphragm valve having portions in sealing engagement therewith and forming a chamber on the outerside of said diaphragm, means for connecting said chamber at all times with a source of lower fluid pressure and with portions of an actuator on one side of a movable member thereof, a disc valve in said chamber having a diaphragm engaging seat, a second diaphragm valve in said casing having portions in sealing engagement therewith and forming a central chamber between said diaphragms, a seat for engaging said second diaphragm, means for connecting said central chamber with portions of the actuator on the opposite side of said movable member thereof, said first mentioned diaphragm being provided with an aperture for connecting said chambers located in position to be closed when said disc valve is seated, said second diaphragm having an aperture therethrough for admitting higher pressure fluid to said central chamber located in position to be closed when said second diaphragm is seated, and a valve actuating part connected with said diaphragms and disc valve and sealingly engaging the same, said second diaphragm being normally held in seated position by the higher pressure fluid and holding said disc valve unseated, the connections between said diaphragms and disc valve and the valve actuating part being constructed to unseat one diaphragm after the other is seated by a movement in either direction, whereby whenever either of said diaphragms are seated, a differential of fluid pressures will be created on opposite sides thereof, tending to hold it firmly seated and prevent leakage.

9. In valve mechanism for controlling power actuators, the combination with a valve casing comprising a central member provided with a central chamber open at both ends, an end member provided with a lower pressure chamber and with means for connecting said chamber with a source of fluid pressure and with a portion of the actuator on one side of a movable member thereof, a second end member provided with a higher pressure chamber and means for connecting it with a source of higher fluid pressure, two diaphragm valves each having marginal portions clamped between said central member and one of said end members, means for uniting said casing members, a disc valve in said lower pressure chamber provided with a seat for engaging the adjacent diaphragm valve, said diaphragm valve being provided with apertures for establishing communication between the lower pressure chamber and the central chamber and located in position to be closed when the disc valve and said diaphragm valve are in seated relation, the other of said diaphragm valves being provided with a seat and with apertures for connecting the higher pressure chamber with said central chamber and located in position to be closed when said diaphragm is seated, said central chamber being provided with means for connecting it with the portion of the actuator on the opposite side of said movable member thereof, a valve actuating part connecting said diaphragm valves and said disc valve and sealingly engaging the same and having a portion extending outside of said casing and holding said valves in position to unseat one of said diaphragm valves after the other is seated by a movement in either direction, the higher fluid pressure holding said second diaphragm seated and the first diaphragm and disc valve in unseated relation, to connect the actuator on both sides of said movable member with the lower fluid pressure source.

10. In valve mechanism for controlling power actuators, the combination with a valve casing comprising a central member provided with a central chamber open at both ends, an end member provided with a lower pressure chamber and with means for connecting said chamber with a source of fluid pressure and with a portion of the actuator on one side of a movable member thereof, a second end member provided with a higher pressure chamber and means for connecting it with a source of higher fluid pressure, two diaphragm valves each having marginal portions clamped between said central member and one of said end members, means for uniting said casing members, a disc valve in said lower pressure chamber provided with a seat for engaging the adjacent diaphragm valve, said diaphragm valve being provided with apertures for establishing communication between the lower pressure chamber and the central chamber and located in position to be closed when the disc valve and said diaphragm valve are in seated relation, the other of said diaphragm valves being provided with a seat and with apertures for connecting the higher pressure chamber with said central chamber and located in position to be closed when said diaphragm is seated, said central chamber being provided with means for connecting it with the portion of the actuator on the opposite side of said movable member thereof, a valve actuating part connecting said diaphragm valves and said disc valve and sealingly engaging the same and having a portion extending outside of said casing and holding said valves in position to unseat one of said diaphragm valves after the other is seated by a movement in either direction, the higher fluid pressure holding said second diaphragm seated and the first diaphragm and disc valve in unseated relation, the portion of said second diaphragm within said seat being of less area than the opposite faces of the first mentioned diaphragm and disc valve exposed to differential pressures when in seated relation.

11. In a brake system for automotive vehicles provided with an internal combustion engine for propelling the same having a throttle controlled suction passage, the combination with a power actuator, comprising a cylinder closed at both ends, and a piston in said cylinder, and brake mechanisms operatively connected with said actuator, of a controlling valve for said actuator comprising a valve casing having adjacent chambers, and provided with an aperture for placing them in communication with each other, valve means for closing said aperture having opposite faces exposed respectively to the pressures in said chambers, a tubular connection from one of said chambers to said suction passage, a tubular connection from said chamber to the portion of said actuator cylinder forward of the piston, a tubular connection from the other of said chambers to the portion of said cylinder in rear of the piston, means for connecting the said second chamber with a source of higher fluid pressure, a second valve means having opposite faces, the one exposed to the higher fluid pressure acting in a direction to close said connecting means, and the other exposed to the pressure in said second chamber, a valve actuating part connecting said valve means, and constructed to effect the movement of one to open position after the other is moved to closed position by a movement in either direction, the differential of fluid pressures on said second valve means holding it in closed position, and the first valve means in open position, when in released position, to maintain both of said chambers in communication with said suction passage and the actuator piston submerged in vacuum, and an operator operated part for effecting relative movement between the valve actuating part and the valve casing.

12. In a brake system for automotive vehicles provided with an internal combustion engine for propelling the same having a throttle controlled suction passage, the combination with a power actuator, comprising a cylinder closed at both ends, and a piston in said cylinder, and brake mechanisms operatively connected with said actuator, of a controlling valve for said actuator comprising a valve casing having adjacent chambers, and provided with an aperture for placing them in communication with each other, valve means for closing said aperture having opposite faces exposed respectively to the pressures in said chambers, a tubular connection from one of said chambers to said suction passage, a tubular connection from said chamber to the portion of said actuator cylinder forward of the piston, a tubular connection from the other of said chambers to the portion of said cylinder in rear of the piston, means for connecting the said second chamber with a source of higher fluid pressure, a second valve means having opposite faces, the one exposed to the higher fluid pressure acting in a direction to close said connecting means, and the other exposed to the pressure in said second chamber, a valve actuating part connecting said valve means, and constructed to effect the movement of one to open position after the other is moved to closed position by a movement in either direction, the differential of fluid pressures on said second valve means holding it in closed position, and the first valve means in open position, when in released position, to maintain both of said chambers in communication with said suction passage and the actuator piston submerged in vacuum, and an operator operated part for effecting relative movement between the valve actuating part and the valve casing, and connected with certain of said brake mechanisms by means providing lost motion to permit the operator to apply his physical force to the brake mechanisms connected therewith.

13. In a brake system for automotive vehicles provided with an internal combustion engine for propelling the same having a throttle controlled suction passage, the combination with a power actuator, comprising a cylinder closed at both ends, and a piston in said cylinder, and brake mechanisms operatively connected with said actuator, of a controlling valve for said actuator comprising a valve casing, a diaphragm valve having portions in sealing engagement therewith and forming a chamber on one side of said diaphragm, a tubular connection from said chamber to said suction passage, a tubular connection from said chamber to the portion of said cylinder forward of the piston, a disc valve in said chamber, having a seat for engaging the diaphragm valve, said casing being provided with a second chamber separated from the first chamber by said diaphragm valve, a tubular connection from said second chamber to the cylinder in rear of the piston, said diaphragm valve being provided with an aperture for connecting said chambers, located in position to be closed when said disc valve is seated, said second chamber being provided with an aperture for connecting it with a source of higher fluid pressure, valve means for closing said aperture having one face exposed at all times to the higher fluid pressure in a direction to effect the closing of said aperture, and the other face exposed to the pressure within said second chamber, a valve actuating device connecting said valve means with said diaphragm valve and disc valve, for holding the disc valve unseated when the said valve means is seated by the differential of fluid pressures thereon, to connect the actuator cylinder on both sides of the piston with said suction passage, and an operator operated part for effecting relative movement between said valve actuating part and the casing, for opening said valve means after seating said disc valve, to effect the power stroke of the actuator piston to apply the brake mechanism.

14. In a brake system for automotive vehicles provided with an internal combustion engine for propelling the same having a throttle controlled suction passage, the combination with a power actuator, comprising a cylinder closed at both ends, and a piston in said cylinder, and brake mechanisms operatively connected with said actuator, of a controlling valve for said actuator comprising a valve casing, a diaphragm valve having portions in sealing engagement therewith and forming a chamber on one side of said diaphragm, a tubular connection from said chamber to said suction passage, a tubular connection from said chamber to the portion of said cylinder forward of the piston, a disc valve in said chamber, having a seat for engaging the diaphragm valve, said casing being provided with a second chamber separated from the first chamber by said diaphragm valve, a tubular connection from said second chamber to the cylinder in rear of the piston, said diaphragm valve being provided with an aperture for connecting said chambers, located in position to be closed when said disc valve is seated, said second chamber being provided with an aperture for connecting it with a source of higher fluid pressure, a diaphragm valve, and a valve seat surrounding said aperture, a second diaphragm for engaging said seat having marginal portions in sealing engagement with the casing and provided with an aperture for admitting higher pressure fluid to the said suction chamber, when said second diaphragm valve is unseated, a valve actuating part connecting said diaphragms and disc valve and constructed to unseat the disc valve when the second diaphragm valve is seated, and an operator operated part for effecting a relative movement between the valve casing and the valve actuating part.

15. In a brake system for automotive vehicles provided with an internal combustion engine for propelling the same having a throttle controlled suction passage, the combination with a power actuator, comprising a cylinder closed at both ends, and a piston in said cylinder, and brake mechanisms operatively connected with said actuator, of a controlling valve for said actuator comprising a valve casing having adjacent chambers, and provided with an aperture for placing them in communication with each other, valve means for closing said aperture having opposite faces exposed respectively to the pressures in said chambers, a tubular connection from one of said chambers to said suction passage, a tubular connection from said chamber to the portion of said actuator cylinder forward of the piston, a tubular connection from the other of said chambers to the portion of said cylinder in rear of the piston, means for connecting the said second chamber with a source of higher fluid pressure, a second valve means having opposite faces, the one exposed to the higher fluid pressure acting in a direction to close said connecting means, and the other exposed to the pressure in said second chamber, a valve actuating part connecting said valve means, and constructed to effect the movement of one to open position after the other is moved to closed position by a movement in either direction, the differential of fluid pressures on said second valve means holding it in closed position, and the first valve means in open position, when in released position, to maintain both of said chambers in communication with said suction passage and the actuator piston submerged in vacuum, and an operator operated part, said valve casing and the valve actuating part being connected the one with said operator operated part and the other with brake mechanism for the vehicle, and means for limiting the relative movement between the valve actuating part and said casing, to enable the operator to apply his physical force to said brake mechanism.

16. In a brake system for automotive vehicles provided with an internal combustion engine for propelling the same having a throttle controlled suction passage, the combination with a power actuator, comprising a cylinder closed at both ends, and a piston in said cylinder, and brake mechanisms operatively connected with said actuator, of a controlling valve for said actuator comprising a valve casing, a diaphragm valve having portions in sealing engagement therewith and forming a chamber on one side of said diaphragm, a tubular connection from said chamber to said suction passage, a tubular connection from said chamber to the portion of said cylinder forward of the piston, a disc valve in said chamber, having a seat for engaging the diaphragm valve, said casing being provided with a second chamber separated from the first chamber by said diaphragm valve, a tubular connection from said second chamber to the cylinder in rear of the piston, said diaphragm valve being provided with an aperture for connecting said chambers, located in position to be closed when said disc valve is seated, said second chamber being provided with an aperture for connecting it with a source of higher fluid pressure, valve means for closing said aperture having one face exposed at all times to the higher fluid pressure in a direction to effect the closing of said aperture, and the other face exposed to the pressure within said second chamber, a valve actuating device connecting said valve means with said diaphragm valve and disc valve, for holding the disc valve unseated when the said valve means is seated by the differential of fluid pressures thereon, to connect the actuator cylinder on both sides of the piston with said suction passage, and an operator operated part, said valve actuating part and the valve casing being connected the one with said operator operated part and the other with brake mechanism for the vehicle, and means for limiting the relative movement between the valve actuating part and said casing, to enable the operator to apply his physical force to said brake mechanism.

17. In a brake system for automotive vehicles provided with an internal combustion engine for propelling the same having a throttle controlled suction passage, the combination with a power actuator, comprising a cylinder closed at both ends, and a piston in said cylinder, and brake mechanisms operatively connected with said actuator, of a controlling valve for said actuator comprising a valve casing having adjacent chambers, and provided with an aperture for placing them in communication with each other, valve means for closing said aperture having opposite faces exposed respectively to the pressures in said chambers, a tubular connection from one of said chambers to said suction passage, a tubular connection from said chamber to the portion of said actuator cylinder forward of the piston, a tubular connection from the other of said chambers to the portion of said cylinder in rear of the piston, means for connecting the said second chamber with a source of higher fluid pressure, a second valve means having opposite faces, the one exposed to the higher fluid pressure acting in a direction to close said connecting means, and the other exposed to the pressure in said second chamber, a valve actuating part connecting said valve means, and constructed to effect the movement of one to open position after the other is moved to closed position by a movement in either direction, the differential of fluid pressures on said second valve means holding it in closed position, and the first valve means in open position, when in released position, to maintain both of said chambers in communication with said suction passage and the actuator piston submerged in vacuum, the portion of said second valve means having its opposite faces exposed to differential pressures when seated being of considerably less area than the portions of said first mentioned valve mechanism exposed on opposite faces to differential pressures when in seated position, and an operator operated part for effecting relative movement between the valve actuating part and the valve casing, to effect the power stroke of the actuator and build up a pressure between said valve means corresponding to that in the cylinder in rear of the piston, the differential of fluid pressures on said valve means effected thereby being transmitted to the operator through the operator operated part.

18. In a brake system for automotive vehicles provided with an internal combustion engine for propelling the same having a throttle controlled suction passage, the combination with a power actuator, comprising a cylinder closed at both ends, and a piston in said cylinder, and brake mechanisms operatively connected with said actuator, of a controlling valve for said actuator comprising a valve casing having adjacent chambers, and provided with an aperture for placing them in communication with each other, valve means for closing said aperture having opposite faces exposed respectively to the pressures in said chambers, a tubular connection from one of said chambers to said suction passage, a tubular connection from said chamber to the portion of said actuator cylinder forward of the piston, a tubular connection from the other of said chambers to the portion of said cylinder in rear of the piston, means for connecting the said second chamber with a source of higher fluid pressure, a second valve means having opposite faces, the one exposed to the higher fluid pressure acting in a direction to close said connecting means, and the other exposed to the pressure in said second chamber, a valve actuating part connecting said valve means, and constructed to effect the movement of one to open position after the other is moved to closed position by a movement in either direction, the differential or fluid pressures on said second valve means holding it in closed position, and the first valve means in open position, when in released position, to maintain both of said chambers in communication with said suction passage and the actuator piston submerged in vacuum, the portion of said second valve means having its opposite faces exposed to differential pressures when seated being of considerably less area than the portions of said first mentioned valve mechanism exposed on opposite faces to differential pressures when in seated position, and an operator operated part, said valve casing and said valve actuating part being connected the one to the operator operated part and the other to brake mechanism of the vehicle, to enable the operator to apply his physical force to said brake mechanism.

19. In a brake system for automotive vehicles provided with an internal combustion engine for propelling the same, having a throttle controlled suction passage, the combination with a power actuator comprising a cylinder closed at both ends, and a piston in said cylinder, and brake mechanism operatively connected with said actuator, of a controlling valve for said actuator comprising a valve casing, a diaphragm valve having portions in sealing engagement therewith and forming a chamber on the outer side of said diaphragm, means for connecting said chamber at all times with the suction passage of the engine and with the actuator cylinder forward of the piston therein, a disc valve in said chamber having a diaphragm engaging seat, a second diaphragm valve in said casing having portions in sealing engagement therewith and forming a central chamber between said diaphragm, a seat for engaging said second diaphragm, means for connecting said central chamber with the cylinder in rear of the piston, said first mentioned diaphragm being provided with an aperture for connecting said chamber located in position to be closed when said disc valve is seated, said second diaphragm having an aperture therethrough for admitting higher pressure fluid to said central chamber located in position to be closed when said second diaphragm is seated, portions of said second diaphragm exposed to differential pressures on opposite faces when seated being of materially less area than the portions of said first mentioned diaphragm, and the disc valve exposed to differential pressures when the disc valve is seated, the valve actuating part connecting said second diaphragm with said first mentioned diaphragm and disc valve, the differential of fluid pressures on the second diaphragm holding the disc valve unseated when the parts are in released position, and an operator operated part, said valve casing and said valve actuating part being connected, the one with said operator operated part, and the other with brake mechanism for the vehicle, and means for limiting the relative movement of the valve actuating part with respect to said casing.

20. In a brake system for automotive vehicles provided with an internal combustion engine for propelling the same having a throttle controlled suction passage, the combination with a power actuator, comprising a cylinder closed at both ends, and a piston in said cylinder, and brake mechanisms operatively connected with said actuator, of a controlling valve for said actuator comprising a valve casing having adjacent chambers, and provided with an aperture for placing them in communication with each other, valve means for closing said aperture having opposite faces exposed respectively to the pressures in said chambers, a tubular connection from one of said chambers to said suction passage, a tubular connection from said chamber to the portion of said actuator cylinder forward of the piston, a tubular connection from the other of said chambers to the portion of said cylinder in rear of the piston, means for connecting the said second chamber with a source of higher fluid pressure, a second valve means having opposite faces, the one exposed to the higher fluid pressure acting in a direction to close said connecting means, and the other exposed to the pressure in said second chamber, a valve actuating part connecting said valve means, and constructed to effect the movement of one to open position after the other is moved to closed position by a movement in either direction, the differential of fluid pressures on said second valve means holding it in closed position, and the first valve means in open position, when in released position, to maintain both of said chambers in communication with said suction passage and the actuator piston submerged in vacuum, and an operator operated part, said valve actuating part and said valve casing being the one connected with said operator operated part, and the other connected with certain of said valve mechanism, operatively connected with the actuator less than the whole number thereof, and means for limiting relative movement of the valve actuating part with respect to the valve casing, whereby said operator operated part may be operated to apply all of said brake mechanisms by power, and to apply the physical force of the operator to said certain brake mechanisms with which it is connected.

21. In a brake system for automotive vehicles provided with an internal combustion engine for propelling the same having a throttle controlled suction passage, the combination with a power actuator, comprising a cylinder closed at both ends, and a piston in said cylinder, and brake mechanisms operatively connected with said actuator, of a controlling valve for said actuator comprising a valve casing having adjacent chambers, and provided with an aperture for placing them in communication with each other, valve means for closing said aperture having opposite faces exposed respectively to the pressures in said chambers, a tubular connection from one of said chambers to said suction passage, a tubular connection from said chamber to the portion of said actuator cylinder forward of the piston, a tubular connection from the other of said chambers to the portion of said cylinder in rear of the piston, means for connecting the said second chamber with a source of higher fluid pressure, a second valve means having opposite faces, the one exposed to the higher fluid pressure acting in a direction to close said connecting means, and the other exposed to the pressure in said second chamber, a valve actuating part connecting said valve means, and constructed to effect the movement of one to open position after the other is moved to closed position by a movement in either direction, the differential of fluid pressures on said second valve means holding it in closed position, and the first valve means in open position, when in released position, to maintain both of said chambers in communication with said suction passage and the actuator piston submerged in vacuum, the portion of said second valve means the opposite faces of which are exposed to differential pressures in the closed position thereof being of less area than the opposite faces of said first mentioned valve means exposed to differential pressures when in closed position, an operator operated part, said valve casing and valve actuating means being the one connected to said operator operated part, and the other connected to certain of said brake mechanisms less than the whole number with which the vehicle is provided, and means for limiting the relative movement between the valve actuating part and the valve casing, whereby all of said brake mechanisms may be applied by power and the operator may apply his physical force to certain of said brake mechanisms connected therewith.

In testimony whereof we affix our signatures.

CALEB S. BRAGG.
VICTOR W. KLIESRATH.